`2,974,128`
Patented Mar. 7, 1961

2,974,128

NOVEL ACETALS AND RESINS THEREFROM

Donald E. Hudgin, Summit, N.J., assignor to Celanese Corporation of America, New York, N.Y., a corporation of Delaware No Drawing. Filed Apr. 9, 1957, Ser. No. 651,572

9 Claims. (Cl. 260—88.3)

This invention relates to unsaturated acetals and to resins produced from unsaturated acetals and polyhydroxy alcohols and more particularly to unsaturated acetals of anhydroenneaheptitol and resins produced therefrom. In accordance with this invention thermosetting resins useful for casting or for the formation of protective coatings are produced from anhydroenneaheptitol.

Anhydroenneaheptitol is a cyclic polyhydroxyalcohol containing four primary hydroxy and one secondary hydroxy group. It is known to have the following structure:

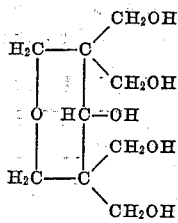

Anhydroenneaheptitol is prepared by the condensation of acetone with formaldehyde in the presence of an alkaline catalyst. The formaldehyde reacts with the replaceable hydrogen atoms of the acetone and the reaction requires six moles of formaldehyde for each mole of acetone. A complete description of the method of preparing anhydroenneaheptitol may be found in U.S. Patent 2,462,031 issued to Harold Wittcoff on February 15, 1949.

In accordance with this invention anhydroenneaheptitol is reacted with an $\alpha,\beta$, ethylenically unsaturated aldehyde to produce an unsaturated acetal, which, in turn, is combined with a polyhydroxy alcohol and cured to produce a useful resin.

The anhydroenneaheptitol is preferably reacted with a straight chain $\alpha$, $\beta$, ethylenically unsaturated aldehyde having not more than four carbon atoms, such as acrolein, or crotonaldehyde.

In the acetalization of anhydroenneaheptitol, the primary hydroxy groups react much more readily than the secondary hydroxy group. Thus, when the aldehyde concentration is low, a mixture of diacetal, monoacetal and free anhydroenneaheptitol is formed with the concentration of diacetal increasing as the concentration of aldehyde reactant is increased until most of the primary hydroxy groups are taken up at the stoichiometric concentration of two moles of aldehyde per mole of anhydroenneaheptitol. It is only after most of the diacetal has been formed that acetalization of the secondary hydroxy group begins to take place. Since there is only one secondary hydroxy group per molecule of anhydroenneaheptitol, its acetalization produces some semi acetal, and to some extent the aldehyde acetalizes the secondary hydroxy groups of two molecules of anhydroenneaheptitol, thereby forming a link between them. Thus the acetalization product is quite complex at all reaction concentrations even, to some extent, those which produce the stoichiometric diacetals.

For the purposes of this invention, it is preferred that the acetalization reaction mixture contain at least two moles of unsaturated aldehyde per mole of anhydroenneaheptitol and preferably between about 5 and 15 moles per mole of anhydroenneaheptitol.

The acetalization reaction may be carried out at a temperature between about 50° C. and about 80° C. The reaction is carried out in the presence of a small amount of acid catalyst, preferably phosphoric acid, although other acids, such as sulfuric and hydrochloric acid may be used. Water may be present in the reaction mixture but it is preferred that its concentration be low. The concentration of acid catalyst is between about 0.1% and 5%.

When phosphoric acid is used as the acetalization catalyst its concentration may vary from about 0.1% to about 5%, although the lower concentration results in prolonged reaction periods. Preferably concentrations between about 0.5% and about 2% are used.

The acetal product is preferably purified by neutralization of the acid catalyst and volatilization of the excess aldehyde, if any. The liquid product is then dissolved in a suitable solvent, such as acetone, decolorized with charcoal and then filtered. Upon evaporation of the acetone, a high purity product is obtained, generally in the form of a thick syrup.

The polyhydroxy alcohols used in accordance with this invention to react with the acetals are those having from two to six hydroxy groups, at least two of which are displaced from each other by a carbon chain of at least three carbon atoms. Among the specific polyhydroxy alcohols which may be used are trimethylol propane; trimethylol ethane, 2,3,5,6 - trimethylol-1,4 - hydroquinone dimethyl ether; 2,4 dihydroxy-3 hydroxy methyl pentane; glycerine; 1,2,6-hexanetriol; 1,2,4-butanetriol; methyl glucoside and dextrose. Among the most useful of the polyhydroxy alcohols are the hexahydroxy sugar alcohols such as mannitol, sorbitol and dulcitol. Of these sorbitol is preferred because of its greater solubility in the unsaturated diacetal and because of the superior physical properties of the resins produced.

The curing catalysts are compounds of acidic nature such as boron fluoride complexes, organic sulfonic acids and tin chloride complexes. Specifically, the catalysts include materials such as boron fluoride hydrate, boron fluoride etherate and boron fluoride acetic acid, 2 chlorcymol sulfonic acid, ethane sulfonic acid and m-benzene sulfonic acid; and tin chloride-hydrochloric acid hexahydrate. The amount of catalyst added depends on the activity of the catalyst and upon the rapidity of curing desired. With a boron fluoride complex as little as a few thousandths of one percent may be used. With other catalysts the amount may be as high as 0.5 or 1.0 percent by weight. Generally, it is preferred to use amounts between about 0.01 and about 0.3 percent by weight.

The unsaturated acetal of anhydroenneaheptitol is combined with from 0.2 to 2.0 equivalents of polyhydroxy alcohol, based upon hydroxy groups in the alcohol per double bond in the acetal and with the curing catalyst at a temperature between about 50° and about 80° C. and preferably precured for a period between about 3 and 30 minutes while stirring to make a uniform mixture. The precured admixture is then permitted to cool while curing is continued until complete. If desired, the entire curing operation may be carried out at a single temperature level between about 50° and about 100° C.

*Example I*

Five hundred parts of acrolein, 200 parts of 81% aqueous anhydroenneaheptitol and 5 parts of 85% phosphoric acid were refluxed for three hours at a temperature of 55° C. The phosphoric acid catalyst was then neutralized with an equivalent amount of sodium bicarbonate and the excess acrolein distilled off. The syrupy liquid remaining was dissolved in 500 parts of acetone, clarified with charcoal, and filtered. The acetone was evaporated off under vacuum leaving diallylidene anhydroenneaheptitol as a thick light yellow syrup.

Sixty parts of diallylidene anhydroenneaheptitol syrup, 6 parts of 70% aqueous sorbitol and 0.3 part of ethane sulfonic acid were heated togethed at 70° C. for five minutes. The thick syrupy precured resin was poured into a mold and cured at room temperature for one week. A hard, light colored, translucent resin was obtained.

*Example II*

Five hundred parts of crotonaldehyde, 123 parts of 81% aqueous anhydroenneaheptitol and 5.2 parts of 85% phosphoric acid were refluxed together at a temperature of 105° C. Water was continuously removed by azeotropic distillation into a side trap. After 38 parts of water were collected, the reaction mixture was neutralized with sodium bicarbonate and the excess crotonaldehyde distilled off under vacuum. The syrupy liquid left was taken up in 500 parts of acetone, clarified with charcoal and the acetone was distilled off under vacuum. About 500 parts of benzene was then added and the residual water was removed by azeotropic distillation. After distillation of the benzene, dicrotonylidene anhydroenneaheptitol remained as a thick syrup.

Three and one half parts of 70% aqueous sorbitol, 32.6 parts of dicrotonylidene anhydroenneaheptitol syrup and 0.2 part of ethane sulfonic acid were heated together for about ten minutes. The solution became quite dark and was poured into an aluminum cup for curing. After several weeks at room temperature the cure was complete and a hard, brown resin obtained.

It is to be understood that the foregoing detailed description is given merely by way of illustration and that many variations may be made therein without departing from the spirit of my invention.

Having described my invention what I desire to secure by Letters Patent is:

1. A method of preparing a resin which comprises combining a polyhydroxy alcohol consisting of carbon, hydrogen and oxygen and containing from two to six hydroxy groups, at least two of which are displaced from each other by a carbon chain of at least three carbon atoms, with an acetal of anhydroenneaheptitol and a member selected from the group consisting of acrolein and crotonaldehyde, and curing the thus obtained admixture in the presence of an acidic catalyst.

2. The method according to claim 1 wherein said polyhydroxy alcohol is a hexahydroxy sugar alcohol.

3. A method of preparing a resin which comprises combining sorbitol with diallylidene anhydroenneaheptitol and curing the thus obtained admixture in the presence of an acidic catalyst.

4. A method of preparing a resin which comprises combining sorbitol with dicrotonylidene anhydroenneaheptitol and curing the thus obtained admixture in the presence of an acidic catalyst.

5. A method of obtaining a resin which comprises reacting anhydroenneaheptitol with acrolein in the presence of a phosphoric acid catalyst, combining the reaction product with sorbitol and curing the thus obtained admixture in the presence of ethane sulfonic acid.

6. A method of obtaining a resin which comprises reacting anhydroenneaheptitol with crotonaldehyde in the presence of a phosphoric acid catalyst, combining the reaction product with sorbitol and curing the thus obtained admixture in the presence of ethane sulfonic acid.

7. The product produced by the process of claim 1.
8. The product produced by the process of claim 3.
9. The product produced by the process of claim 4.

References Cited in the file of this patent

UNITED STATES PATENTS

| | | |
|---|---|---|
| 2,483,739 | Roach et al. | Oct. 4, 1946 |
| 2,569,932 | Izard | Oct. 2, 1951 |
| 2,687,407 | Orth | Aug. 24, 1954 |

FOREIGN PATENTS

| | | |
|---|---|---|
| 870,032 | Germany | Mar. 9, 1953 |

OTHER REFERENCES

Olsen: Chemische Berichte, Vd. 88, 1955, pp. 205, 207.